United States Patent
Mao et al.

(10) Patent No.: US 8,828,248 B2
(45) Date of Patent: Sep. 9, 2014

(54) METHOD FOR DEFECT REDUCTION IN MAGNETIC WRITE HEAD FABRICATION

(71) Applicant: HGST Netherlands B.V., Amsterdam (NL)

(72) Inventors: Guomin Mao, San Jose, CA (US);
Satyanarayana Myneni, Sunnyvale, CA (US); Aron Pentek, San Jose, CA (US);
Xiaoye Zhao, Mountain View, CA (US)

(73) Assignee: HGST Netherlands B.V, Amsterdam (NL)

( * ) Notice: Subject to any disclaimer, the term of this patent is extended or adjusted under 35 U.S.C. 154(b) by 0 days.

(21) Appl. No.: 13/756,888

(22) Filed: Feb. 1, 2013

(65) Prior Publication Data

US 2014/0217060 A1    Aug. 7, 2014

(51) Int. Cl.
*B44C 1/22*   (2006.01)
(52) U.S. Cl.
USPC .............. 216/22; 216/41; 216/72; 438/714; 438/720
(58) Field of Classification Search
USPC ........... 216/22, 41, 49, 59, 63, 67, 75, 81, 72; 438/706, 710, 714, 720
See application file for complete search history.

(56) References Cited

U.S. PATENT DOCUMENTS

| | | | |
|---|---|---|---|
| 5,841,196 A * | 11/1998 | Gupta et al. | 257/774 |
| 7,037,850 B2 | 5/2006 | Lee et al. | |
| 7,380,332 B2 | 6/2008 | Bedell et al. | |
| 7,566,654 B2 * | 7/2009 | Yasuda | 438/643 |
| 7,972,951 B2 | 7/2011 | Hui et al. | |
| 2004/0129361 A1 | 7/2004 | Chen et al. | |
| 2004/0171272 A1 * | 9/2004 | Jin et al. | 438/708 |
| 2005/0051820 A1 * | 3/2005 | Stojakovic et al. | 257/295 |
| 2006/0174474 A1 * | 8/2006 | Le | 29/603.12 |
| 2006/0292876 A1 | 12/2006 | Naito | |
| 2009/0057266 A1 | 3/2009 | Tuncel et al. | |
| 2010/0022088 A1 * | 1/2010 | Wallner et al. | 438/694 |
| 2013/0104388 A1 * | 5/2013 | Mao et al. | 29/603.27 |

OTHER PUBLICATIONS

IBM TDB: "CF4 RIE Pre-Etch During Etchback of Sidewall Formation", IBM Technical Disclosure Bulletin, vol. 29, No. 1, Jun. 1986, pp. 110-111.
Kwon et al.: "Characterization of Via Etching in CHF3/CF4 Magnetically Enhanced Reactive Ion Etching Using Neural Networks", ETRI Journal vol. 24, No. 3, Jun. 2002, 10 pages.

* cited by examiner

*Primary Examiner* — Lan Vinh
(74) *Attorney, Agent, or Firm* — Patterson & Sheridan, LLP (57) ABSTRACT

Write heads may be formed by reactive ion etching (RIE) a dielectric mask and then reactive ion etching a polymeric underlayer. The first RIE affects the second RIE. The first portion of the first RIE process is performed with a ratio of $CF_4$ to $CHF_3$ between about 1.3 to 2, a gas flow ratio of $CF_4$ to He between 2.2 and about 3, and a ratio of RF source power to RF bias power between about 10 and about 16. The second portion of the first RIE process is performed with a ratio of $CF_4$ to $CHF_3$ between about 0.3 to 0.8, a gas flow ratio of $CF_4$ to He between about 1.2 and about 1.8, and a ratio of RF source power to RF bias between about 22 to 28. With the above parameters, the dielectric mask can be formed with minimized damage on the underlayer.

20 Claims, 6 Drawing Sheets

METHOD FOR DEFECT REDUCTION IN MAGNETIC WRITE HEAD FABRICATION

BACKGROUND OF THE INVENTION

1. Field of the Invention

Embodiments of the present invention generally relate to methods of making write poles for perpendicular magnetic recording write heads.

2. Description of the Related Art

Perpendicular magnetic recording systems are utilized in computer hard disk drives. A typical perpendicular recording write head includes a trailing write pole, a leading return or opposing pole magnetically coupled to the write pole, and an electrically conductive magnetizing coil around the write pole. The magnetic fields of bits of stored information are oriented normal to the plane of the thin film of the media, and thus, perpendicular to the direction of a circular data track.

As one of the most important parts of the magnetic hard disk drive, the main pole of the magnetic write head can be manufactured by a dry pole mill process method, in which layers of magnetic materials (or layers of magnetic and non-magnetic materials) deposited (or sputtered) on the substrate are etched by ion mill process, and the magnetic write poles with either trapezoid or triangle cross-section shapes are then formed. Prior to the ion mill process, a high quality mask have to be prepared to serve as mask during the ion mill.

Unfortunately, during the dry pole milling process, any defect on the masking layers will negatively impact forming the magnetic write pole. Therefore, there is a need to effectively form the high quality masks and thus, the high performance magnetic write pole.

SUMMARY OF THE INVENTION

Methods of making write poles for perpendicular magnetic recording write heads are disclosed. Write heads may be formed by reactive ion etching (RIE) a dielectric mask in a first reactive ion etching process having a fluorine based chemistry, a reactive ion etching a polymeric underlayer in a second reactive ion etching process with an oxygen based chemistry, and then ion beam milling a magnetic and non-magnetic stack layers with Ar ion beam. The first reactive ion etching affects the second reactive ion etching and thus affects the ion milling process. By maintaining the first reactive ion etching process with a gas flow ratio of $CF_4$ to $CHF_3$ between about 1.3 to about 2 and another gas flow ratio of $CF_4$ to He between about 2.2 to about 3, and a power ratio of a RF source power applied to the RIE chamber to the RF bias power upon which the substrate wafer of the write head is placed is between about 10 to about 16, the dielectric mask can be formed to fit the production requirements. The polymeric underlayer may be uniformly etched during the second reactive ion etching, and magnetic and non-magnetic materials may be milled in the ion milling process to form magnetic write pole structure.

In one embodiment, a method of making a write pole for a perpendicular magnetic recording write head comprises: forming a photoresist mask over a dielectric hard mask layer of a stack such that the photoresist mask covers a first portion of the dielectric hard mask layer and leaves a second portion exposed. The stack comprises: a layer of magnetic material formed over a substrate; a layer of non-magnetic material formed over the layer of magnetic material; a polymeric underlayer formed over the layer of non-magnetic material; and the dielectric hard mask layer formed over the polymeric underlayer. The method additionally comprises performing a first reactive ion etch process to remove the exposed second portion of the dielectric hard mask layer such that a portion of the polymeric underlayer is exposed and a dielectric hard mask is formed, wherein the first reactive ion etch process comprises exposing the second portion of the dielectric hard mask layer to an etching gas comprising $CF_4$ and $CHF_3$ and He, wherein gas flow ratio of $CF_4$ to $CHF_3$ is between about 1.3 to 2 and another gas flow ratio of $CF_4$ to He is between about 2.2 and about 3; and performing a second reactive ion etch process to remove the exposed polymeric underlayer to expose the layer of non-magnetic material, and then performing a ion milling process to form the magnetic write pole structure.

In another embodiment, a method of making a write pole for a perpendicular magnetic recording write head comprises forming a photoresist mask over a dielectric hard mask layer of a stack such that the photoresist mask covers a first portion of the dielectric hard mask layer and leaves a second portion exposed. The stack comprises: a layer of magnetic material formed over a substrate; a layer of non-magnetic material formed over the layer of magnetic material; a polymeric underlayer formed over the layer of non-magnetic material; and the dielectric hard mask layer formed over the polymeric underlayer. The method additionally comprises performing a first reactive ion etch process to remove the exposed second portion of the dielectric hard mask layer such that a portion of the polymeric underlayer is exposed and a dielectric hard mask is formed, wherein the first reactive ion etch process further comprises applying a RF source power to the RIE chamber and also applying a RF bias power to the electrode upon which the substrate wafer of the write head is placed and the ratio of the RF source power to RF bias is between about 10 to about 16, and performing a second reactive ion etch process to remove the exposed polymeric underlayer to expose the layer of non-magnetic material, and then performing a ion milling process to form the magnetic write pole structure.

In another embodiment, a method of making a write pole for a perpendicular magnetic recording write head comprises forming a photoresist mask over a dielectric hard mask layer of a stack such that the photoresist mask covers a first portion of the dielectric hard mask layer and leaves a second portion exposed. The stack comprises: a layer of magnetic material formed over a substrate; a layer of non-magnetic material formed over the layer of magnetic material; a polymeric underlayer formed over the layer of non-magnetic material; and the dielectric hard mask layer formed over the polymeric underlayer. The method additionally comprises performing a first reactive ion etch process to remove the exposed second portion of the dielectric hard mask layer such that a portion of the polymeric underlayer is exposed and a dielectric hard mask is formed, wherein the first reactive ion etch process further comprises of two step RIE processes: the main etch (ME) process and the over etch (OE) process: in the ME process, the etching gas comprises of $CF_4$ and $CHF_3$ and He, wherein gas flow ratio of $CF_4$ to $CHF_3$ is between about 1.3 to about 2 and another gas flow ratio of $CF_4$ to He is between about 2.2 and about 3 and a ratio of the RF source power to RF bias power is between about 10 and about 16; in the OE process, the etching gas also comprises of $CF_4$ and $CHF_3$ and He, wherein gas flow ratio of $CF_4$ to $CHF_3$ is between about 0.3 to about 0.8 and another gas flow ratio of $CF_4$ to He is between about 1.2 and about 1.8 and a power ratio of the RF source power to RF bias is between about 22 to about 28; and performing a second reactive ion etch process to remove the exposed polymeric underlayer to expose the layer of non-magnetic material; then ion milling the exposed portions of the layer of non-magnetic material to expose the layer of magnetic material; and ion milling exposed portions of the layer of magnetic material to form a write pole that is tapered from the polymeric underlayer mask to the substrate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior arts, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Methods of making write poles for perpendicular magnetic recording write heads are disclosed. Write heads may be formed by reactive ion etching a dielectric mask in a first reactive ion etching process having a fluorine based chemistry and then reactive ion etching a polymeric underlayer in a second reactive ion etching process with an oxygen based chemistry, and then ion beam milling a magnetic and non-magnetic stack layers with Ar ion beam. The first reactive ion etching affects the second reactive ion etching, and thus affect ion milling process. By maintaining the first reactive ion etching process with a gas flow ratio of $CF_4$ to $CHF_3$ between about 1.3 to about 2 and another gas flow ratio of $CF_4$ to He between about 2.2 and about 3, and a power ratio of a RF source power applied to the RIE chamber to the RF bias power upon which the substrate wafer of the write head is placed is between about 10 to about 16, the dielectric mask can be formed to fit the production requirements. The polymeric underlayer may be uniformly etched during the second reactive ion etching, and magnetic and non-magnetic materials may be milled in the ion milling process to form magnetic write pole structure.

Figure 1:
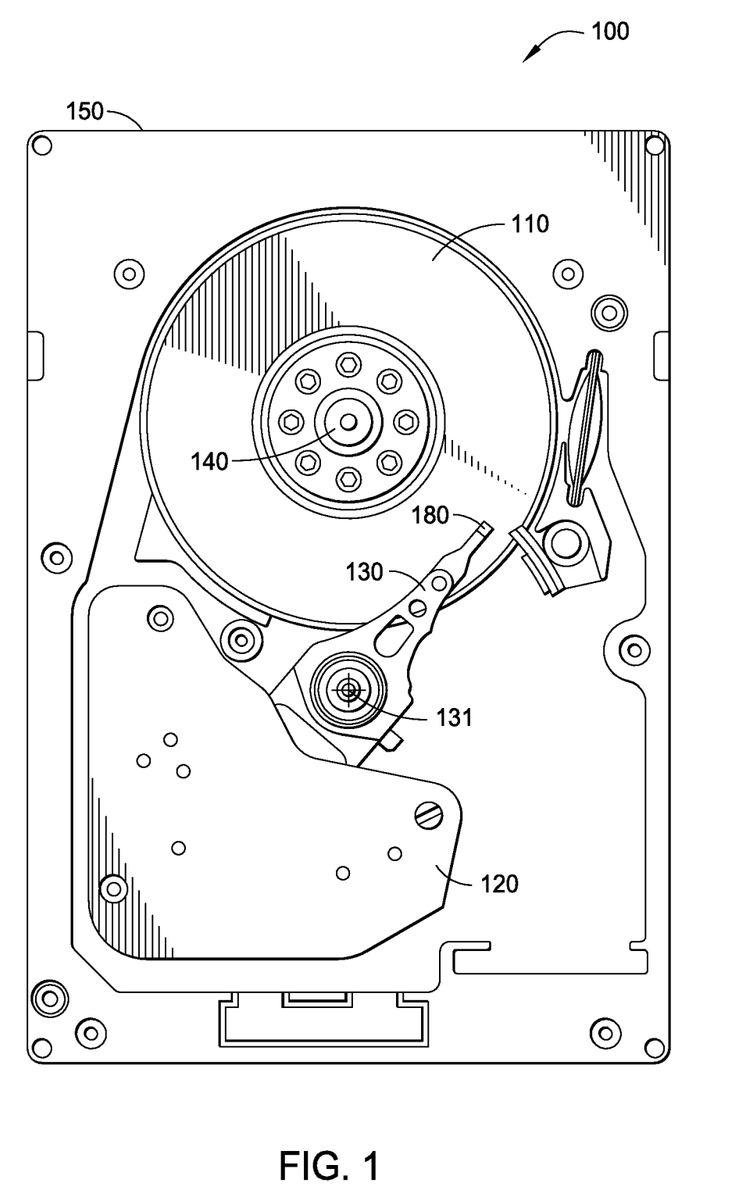
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. An electromagnetic head 180 may be positioned on a track. As each disk spins, data may be written and/or read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

A plurality of magnetic disks may be stacked vertically in HDD 100. Each disk may have read and write tracks on each side of the disk. Therefore, electromagnetic heads may be placed on both sides of the disk. In some embodiments, a single magnetic head may be configured to access data tracks on the bottom face of a first disk and a top face of a second disk.

Each actuator arm 130 may be coupled to actuator 120. Actuator 120 may be a motor configured to control the swiveling movement of actuator arm 130 to place electromagnetic head 180 on a given data track. In one embodiment, the actuator arms 130 may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 2A:
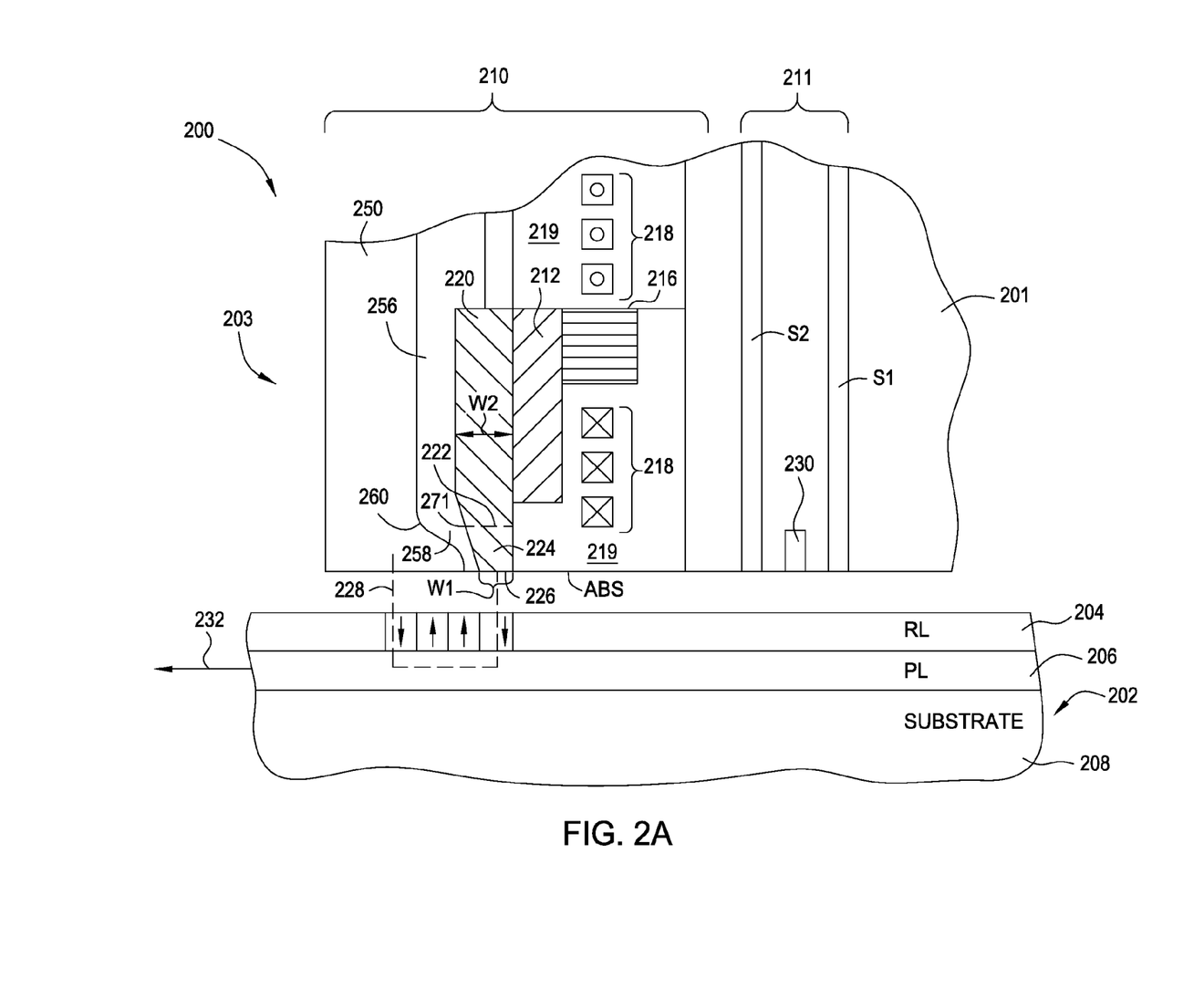
FIG. 2A is a side view of a read/write head and magnetic disk of the disk drive of FIG. 1, according to one embodiment of the invention.

FIG. 2A is a fragmented, cross-sectional side view through the center of an embodiment of a read/write head 200 mounted on a slider 201 and facing magnetic disk 202. The read/write head 200 and magnetic disk 202 may correspond to the electromagnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a magnetoresistive (MR) read head that includes an MR sensing element 230 located between MR shields S1 and S2. In other embodiments, the magnetic read head 211 is a magnetic tunneling junction (MTJ) read head that includes an MTJ sensing device 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR (or MTJ) sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Figure 2B:
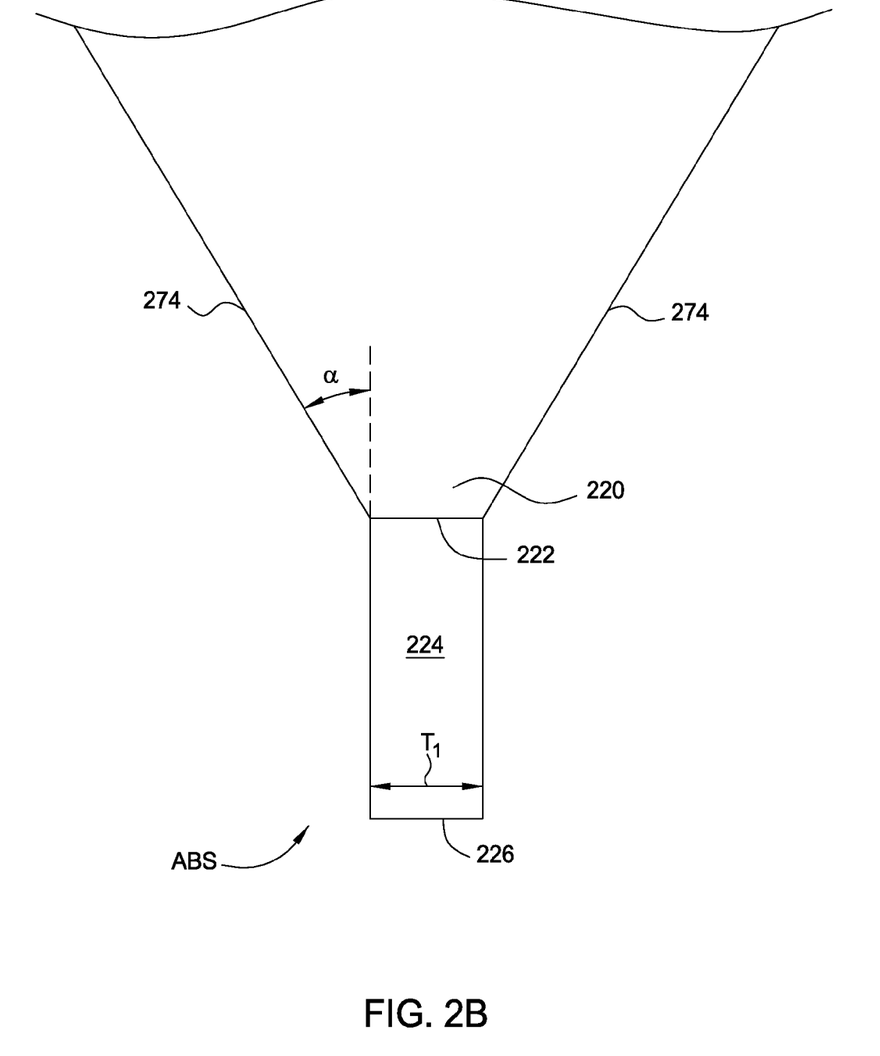
FIG. 2B is an enlarged top view of a portion of the read/write head of FIG. 2A, according to a further embodiment of the invention.

Write pole 220 is a flared write pole and includes a flare point 222 and a pole tip 224 that includes an end 226 that defines part of the ABS. The width of the write pole 220 in a first direction (into and out of the page in FIG. 2A) increases from a first width at the flare point 222 to greater widths away from the ABS, as is shown in FIG. 2B. The flare may extend the entire height of write pole 220 (i.e., from the end 226 of the write pole 220 to the top of the write pole 220), or may only extend from the flare point 222, as shown in FIG. 2B. In one embodiment the distance between the flare point 222 and the ABS is between about 10 nm and about 150 nm.

The write pole 220 includes a tapered surface 271 which increases a width of the write pole 220 from a first width W1 at the ABS to a second width W2 away from the ABS. In one embodiment, the width W1 may be between around 50 nm and 200 nm, and the width W2 may be between around 100 nm and 350 nm. While the tapered region 271 is shown with a single straight surface in FIG. 2A, in alternative embodiment, the tapered region 271 may include a plurality of tapered surface with different taper angles with respect to the ABS. The fabrication of the tapered region 271 is discussed in greater detail below.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2A further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

FIG. 2B shows an enlarged top view of the write pole 220 of FIG. 2A, with the shield layer 250 and the gap layer 256 removed to show details of the write pole 220, according to an embodiment of the invention. The write pole 220 includes flared sides 274, which extend from the flare point 222 away from the ABS, such that the main pole increases from a first width $T_1$ to greater widths in a direction away from the ABS.

In some embodiments, the first width, $T_1$ is between 20 nm and 150 nm. The flared sides 274 form an angle α with respect to a plane parallel to the ABS surface. In one embodiment α is between about 30 degrees and about 60 degrees. The flare point 222 may be between about 30 nm and about 275 nm from the ABS.

FIGS. 3A-3D illustrate a write pole at various stages of production. The write pole comprises a substrate 302 having a layer of magnetic material 304 formed thereover. Suitable materials for the substrate 302 include insulating materials such as alumina. The layer (or layers) of magnetic material 304 that will eventually become the write pole 220 include not only a single layer of magnetic material, but laminates of high-moment magnetic material that include nickel, iron, cobalt and alloys thereof, such as CoFe or NiFe. The layer of magnetic material 304 may be deposited by deposition methods such as sputtering or electroplating.

Over the layer of magnetic material 304, a layer (or layers) of non-magnetic material 305 is deposited such as DLC (diamond like carbon), carbon, PLC (polymer like carbon), alumina, silicon oxide, silicon nitride, silicon carbide, or metals and their alloys such as Ta, TaN and etc. The non-magnetic layer 305 functions as part of the mill mask in addition to the polymeric underlayer mask during the ion mill process of the magnetic material 304, and also prevents damaging or oxidizing the magnetic material 304 during the rework of the polymeric underlayer mask 306 in case that the CD (critical dimension) of the mask and other geometric parameters such as shape factors (for example, the ratio of top CD to bottom CD of the polymeric underlayer mask) are out of the production specification and the substrates are forced to a re-work loop in which plasma ash and wet strip are employed to remove the polymeric underlayer mask but have no damage to the non-magnetic mill mask layer which is not sensitive to the plasma ash and wet strip processes. A polymeric underlayer 306 is deposited after the formation of the non-magnetic mill mask layer 305. The suitable polymeric underlayer material that may be utilized are polymeric materials that can be cured at a relatively low temperature, such as around 150 to 250 degrees Celsius. The examples of such polymeric materials include SIUL (Shin-Etsu Chemical Co., Ltd.), DURIMIDE (Fujifilm Corporation), JSR HM8006 (Honeywell International Inc.), ACCUFLO T-31 (Honeywell International Inc.) or etc. However, it should be understood that other polymeric materials may be utilized as well as long as they are suitable and fit to the requirements of the ion mill process.

A dielectric hard mask layer 308 is deposited over the polymeric underlayer 306. The dielectric hard mask layer 308 can be constructed of a dielectric material and is preferably constructed of a silicon containing materials such as silicon oxide, silicon nitride, silicon oxynitride or a silicon containing organic material such as SIHM (Shin-Etsu Chemical Co., Ltd.), UVAS (Honeywell International Inc.) and etc. The thickness of the dielectric hard mask layer 308 depends on the thickness of the polymeric underlayer 306 and the etch rate selectivity of the dielectric hard mask layer 308 to polymeric underlayer 306 in the second RIE process (to be discussed below) to transfer the mask pattern of the dielectric hard mask layer 308 onto the polymeric underlayer 306. Generally, the thicker the polymeric under-layer 306, the thicker the dielectric hard mask layer 308 will have to be. An optional bottom anti-reflective coating (BARC) may be applied over the dielectric hard mask layer 308. The determination of whether a BARC layer is needed depends on the requirements of the photolithographic process and on the material used for the first RIE on the dielectric hard mask layer 308. For example, if the dielectric hard mask layer 308 is a material that can act as a BARC, then no BARC layer is needed. Such materials for the BARC include silicon oxynitride, SIHM (Shin-Etsu Chemical Co., Ltd.), UVAS (Honeywell International Inc.). Also, no BARC is needed if the dielectric hard mask layer 308 is sufficiently thin and the critical dimensions of the magnetic pole are large enough that the polymeric underlayer 306 can function as a BARC. However, some form of BARC is desirable to control photolithography parameters such as reflective swing and photo critical dimensions, in this case, for simplicity, the dielectric layer and BARC layer are collectively shown as one layer in the drawings and referred to as dielectric hard mask layer 308.

A photoresist mask 310 is then formed over the dielectric hard mask layer 308 to cover a first portion of the dielectric hard mask layer 308 and leave a second portion of the dielectric hard mask layer 308 exposed. The dielectric hard mask layer 308 is then patterned by a first RIE process to form a hard mask 312. The hard mask 312 is formed by performing the first RIE process utilizing a fluorocarbon based chemistry that utilizes $CF_4$, $CHF_3$ and helium. The first RIE process comprises removing the exposed second portion of the dielectric hard mask layer 308 such that a portion of the polymeric underlayer 306 is exposed and the dielectric hard mask 312 is formed.

The polymeric underlayer 306 is then patterned by a second RIE process utilizing an oxygen based chemistry. The second RIE process comprises removing the exposed second portion of the polymeric underlayer 306 such that a portion of the non-magnetic mill mask layer 305 is exposed. The polymeric underlayer mask 306 is used as a mask for milling both non-magnetic material 305 and magnetic material 304 to form the write pole 220. The dimension and geometric profile of the polymeric underlayer mask 306 is thus important to control the ion milling pole formation. The second RIE process is an oxygen based chemistry utilizing a gas such as $CO_2$, $O_2$ or a combination thereof. In order to taper the walls nitrogen may be added to the gas mixture. The relative ratio of the oxygen containing gas to the nitrogen gas can be tuned to ensure the polymeric underlayer 306 is etched to produce tapered walls. In one embodiment, the ratio can be between 15:1 to 1.5:1. The etch rate selectivity on dielectric hard mask layer 308 over the polymeric underlayer 306 for the second RIE process is high, usually 10 or above, (i.e., the etch rate of the dielectric hard mask layer 308 in the oxygen plasma is much slower than that of the polymeric underlayer 306).

Following the second RIE process, an ion mill process occurs to form the write pole. The ion milling process utilizes argon ions. During the ion milling process, the ions are directed at an angle towards the layer of magnetic material 304. The angle at which the ions are directed is selected based upon the desired bevel angle and generally corresponds to the desired bevel angle.

One plasma tool especially suitable for the first fluorine based RIE process to etch the Si containing hard mask material is Plasma-Therm's® Versalock® etcher, which is an inductively coupled plasma (ICP) etch system in which the plasma is generated by means of inductively coupling 2 MHz RF power (the source power) while independently controlling the ion energy directed toward the substrate via 13.56 MHz bias power. This separate power control allows a wider range of RIE processes to be performed, ranging from highly chemical processes to highly physical processes. The Versalock® etcher is equipped with Optical Emission Spectrometry (OES) endpoint system that the over-etch amount can be precisely controlled via the determination of etch endpoint.

Many Other ICP etchers equipped with both source and bias power suppliers, such as TCP9400DFM® from Lam Research Inc.®, or DPS® from Applied Materials Inc.®, can also be used for the RIE process of the Si containing hard mask material. It is expected that the RIE process presented here can be transferable transparently in different ICP etchers by doing minor tuning of the RIE parameters.

Figure 4A:
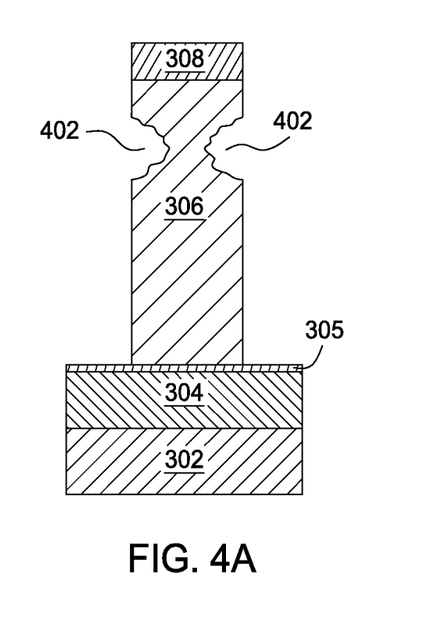
FIGS. 4A-4C are schematic illustrations of a write pole after the second RIE process.
Figure 4B:
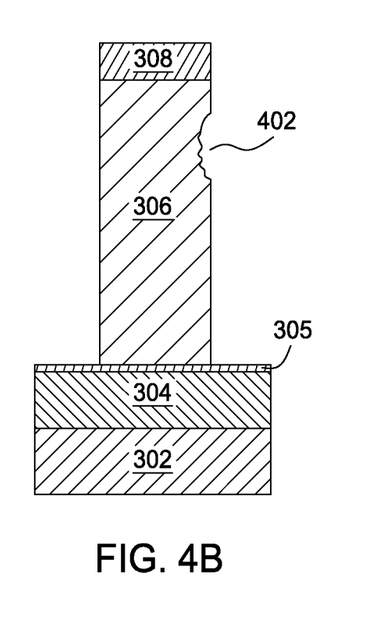
Figure 4C:
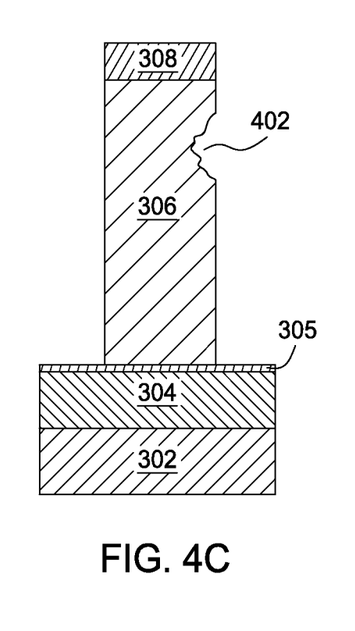

FIGS. 4A-4C are schematic illustrations of a write pole after the second RIE process. As shown in FIGS. 4A-4C, defects 402 may be present in the polymeric underlayer 306 following the second RIE process. The defect can lead to poor ion milling results and thus, negatively impact the angle of the write pole tip. One kind of defect often observed in the mass production of the write heads is a top-defect which is always observed at the top portion of the polymeric underlayer pole (below the dielectric hard mask), as shown in FIGS. 4A-4C. The existence of the top-defects impacts the quality of the subsequent ion mill process which is used to form the magnetic write pole. The severity of the top defect can vary a lot, from a minor defect as shown in FIG. 4B, to a bigger side wall cave as shown in FIG. 4C, and to the severe erosion of the side wall at the top part of the mask as shown in FIG. 4A. Due to the defects 402, the polymeric underlayer mask 306 may lose its mask function in the subsequent ion mill process and could cause drift on both CD and profile of the milled magnetic write pole and thus degrade the recoding performance of the write head. If the top defects are caught by inspection, then rework is required, and the cycle time and the manufacture cost of the production is increased; and if the top defects are not caught and the wafers are sent on to next operation (i.e., ion mill) then the production yield of the main pole is affected. In either case, the top-defects have a negative impact to the production of the magnetic write head.

The top-defects 402 may occur at different locations on the wafer and may also vary from wafer to wafer. Moreover, the defects 402 may become more severe when the size of the ABS is shrunk to even smaller dimension for future generations of magnetic write head which requires thicker underlayer mask and smaller CD.

Figure 3A:
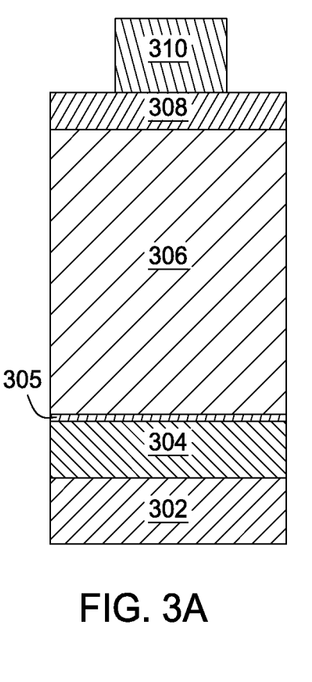
FIGS. 3A-3D are schematic cross-sectional views of a write pole at various stages of processing.
Figure 3B:
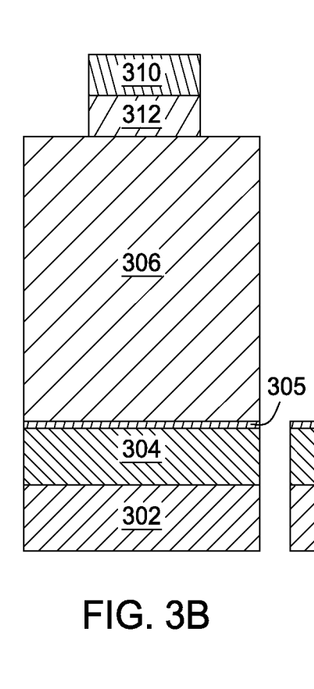
Figures 3C, 3D:
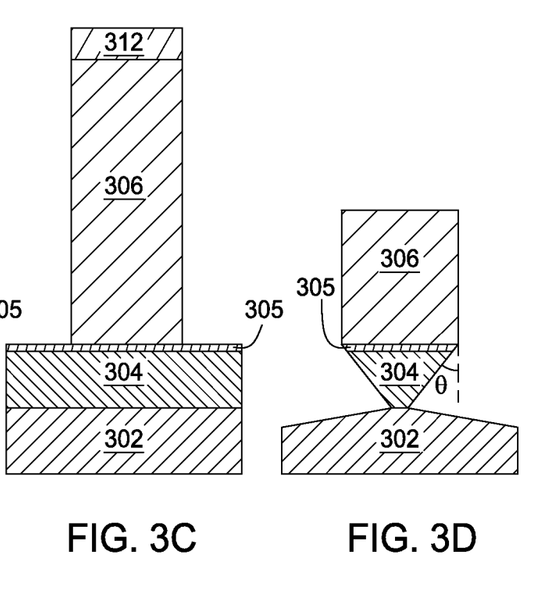

As can be seen from FIGS. 4A-4C, especially when compared to FIG. 3C, there are defects 402 that form in the polymeric underlayer 306, yet the dielectric hard mask layer 308 has no defects. Thus, the natural assumption is that the second RIE process damages the polymeric underlayer 306. By testing and checking carefully the RIE parameters in the second RIE process, including the gas ratio of $CO_2$ to $N_2$, RF powers, Applicants have discovered that the effects of the RIE parameters in the second RIE process are not significant to create an even minor defect. For example, when changing the $N_2$ gas flow in a relatively large range (i.e., ±23%), top-defects are not observed. Therefore, the variation of the RIE parameters of the second RIE process can not be accounted towards main reason to have top-defects on underlayer mask.

Applicants have surprisingly discovered that the first RIE process, and not the second RIE process, leads to the defects 402. By screening the RIE parameters in the first RIE process, it has been found that the over etch time of the first dielectric RIE is closely correlated with the top-defects observed after the second RIE process. With the increasing of the over-etch (OE) amount of the first RIE process, the top defects gradually get worse and more severe.

Since the over etch amount of the first RIE process is the cause of the defects 402, naturally one may think the dielectric hard mask 312 formed in the first RIE process should have some defects such as that the dielectric hard mask 312 may lose some function during the second RIE process. However, the profile and also the CD of the dielectric hard mask 312 after the first RIE process does not have significant variation that could cause the top-defects.

During the first RIE process, the polymeric underlayer 306 is exposed to the fluorocarbon plasma and hence, the top part of the underlayer 306 is etched by the plasma due to the reaction of the plasma with the surface of the underlayer 306. It is believed that the plasma etchants penetrate to a certain depth of the underlayer 306 below the boundary interface between the dielectric hard mask 312 and underlayer 306 and react with polymeric underlayer such that the portion of underlayer 306 closest to the boundary interface may change its chemical and physical properties during the over etch of the first RIE process, and this property change makes it easier for the top portion of the polymeric underlayer to be etched away in the second oxygen based RIE process than the rest of the underlayer thus to produce defects at the top portion of the underlayer mask. Since the underlayer 306 may comprise a polyimide like polymer and its structure can be easily modified by the ions and/or radicals of the plasma, it is expected that the top portion of the underlayer 306 which is exposed to fluorocarbon plasma reacts with the fluorocarbon plasma or its surface texture is modified by the plasma. The degree of the change diminishes as it is further away from the top surface towards the deeper underlayer 306, therefore it should not create such defects at any part of the underlayer mask except at the top portion of the underlayer mask.

As shown in FIGS. 4A-4C, the top-defects 402 are not at the interface between dielectric hard mask 312 and underlayer 306, but some distance away from the interface. The defects 402 thus do not directly relate with the quality of the dielectric hard mask 312. Rather, the defects 402 are due to the modified chemical properties of the top portion of the underlayer 306 which has reacted with oxygen based plasma.

The change of the property of the top part of the underlayer 306 gets stronger as the over etch of the first RIE process is longer. Thus, the erosion of the underlayer 306 during the second RIE process gets worse.

Since the properties of the underlayer 306 undergoes change both chemically and physically while being exposed to the fluorocarbon plasma during the first RIE process, a few possible methods can be employed to reduce the interaction between the underlayer polyimide with fluorocarbon plasma: (1) reducing the surface contact area between the underlayer 306 to fluorocarbon plasma; (2) shortening the over etch time of the first RIE process; (3) weakening the plasma intensity of the first RIE; or (4) changing the plasma chemistry of the over etch of the first RIE.

Option (1) in general works for reducing the total amount of underlayer 306 reacting with the plasma, however, the mask pattern area is subject to the write head design and is generally very limited. For option (2), due to the non uniformity of the film with in wafer and wafer to wafer, the topography variation of the feature on the wafers, and the RIE equipment variation, it is required to have a minimum amount of over etch in the first RIE process to cover those uncertainties. Thus a shortening the first RIE process is not an option. For option (3), it is possible to reduce the overall plasma intensity, especially the DC bias of the plasma to reduce the reaction with the underlayer 306; however, the minimum DC bias is subject to the tool capability. For option (4), the chemistry of the plasma can be altered to be less reactive with the underlayer 306. In fact, option (4) can be combined with option (3) to reduce the reactivity.

The RIE parameters for the first RIE process have been beneficially discovered to be a gas ratio ($CF_4$ to $CHF_3$ gas flow) and a power ratio (the source power to bias power). It is to be understood that the first RIE process is actually a two step RIE process. In the first portion (or the main etch (ME)) of the first RIE process, the dielectric hard mask layer 308 is processed to form the dielectric hard mask 312. Once the endpoint for etching the dielectric hard mask 312 is detected, the RIE process enters the second portion (or the over etch (OE)) of the first RIE process. In the second portion of the first RIE process, the parameters change to conduct the over etch process discussed above. In the first portion of the RIE process (ME), the gas ratio of $CF_4$ to $CHF_3$ gas flow may be between about 1.3 and about 2 and the power ratio may be between about 10 to about 16. Thus, in the second portion of the first RIE process (OE), both the fluorocarbon ratio and the RF power ratio change. The gas ratio of $CF_4/CHF_3$ reduces to about 0.3 to 0.8, which is to increase the relative amount of the $CHF_3$ gas flow in the plasma. The gas ratio reduction reduces the ability to etch the underlayer 306 during the over etch portion of the first RIE process. Similarly, the power ratio of the over etch is increased up to between about 22 and about 28 to reduce the physical bombardment of the plasma on the underlayer 306, and thus reduce the possible property variation the underlayer 306 during the over etch of the first RIE process.

Applicants have discovered that when the gas ratio is reduced, the defects 402 were reduced or eliminated. Because $CF_4$ etches the underlayer 306 much faster than $CHF_3$, using more $CHF_3$ in the over etch portion of the first RIE process than in the main etch portion of the first RIE process, less underlayer 306 is etched. While $CHF_3$ doesn't etch the underlayer 308 very much without assistance of other gases such as $O_2$, $CHF_3$ still etches the dielectric hard mask layer 308 such that the desired dielectric material from the dielectric hard mask layer 308 can be removed thoroughly during the second portion of the first RIE process. By increasing the power ratio, the physical bombardment of the plasma ions and radicals are much weaker and effectively reduce the reaction between the plasma of the over etch of the first RIE and the underlayer 306. The lower gas ratio has less etch ability on the underlayer 306 and the higher power ratio leads to less physical bombardment which further reduces the reactivity of plasma to the underlayer 306.

Generally, to use dry plasma to etch silicon containing materials such as SiHM with certain controllable CD and side-wall, the plasma chemistry is basically fluorine containing gases (such as $CF_4$ and $CHF_3$). The different combination of gas flow between $CF_4$ and $CHF_3$ can have different effects on the exposed polymeric underlayer 306 as described above. However, the adjustment on the gas ratio of $CF_4$ to $CHF_3$ may not be sufficient to complete eliminate the possible appearance of the top-defects, therefore a third gas Helium (He) has been introduced to assist reducing the damage of polymeric underlayer 306 from the plasma of the over etch of the first RIE. Since He has much less ionization and much less physical etching effect on the underlayer compared with all other gases used, the addition of He gas provides a beneficial effects during the over etch of the first RIE.

The addition of Helium gas can effectively dilute the etchants in the plasma and provide leaner chemistry, thus reduce the plasma intensity and make etching process is more gentle, especially, in the over etch of the first RIE, wherein the $CF_4$ gas flow is reduced (to reduce the $CF_4/CHF_3$ gas ratio), the addition of He further reduce effect of the plasma from $CF_4$ on the polymeric underlayer 306. In addition, the much low ionization and much less mass of He comparing with other gases such as Ar or $O_2$, the physical bombardment of the He to the polymeric underlayer 306 is minimum. The addition of either Ar and $O_2$ to the first RIE can have more damage on the underlayer since Ar is much easier to ionized and enhance the plasma to have more reaction with underlayer and $O_2$ plasma can easily react with polymeric underlay to have more damage. A gas flow ratio of the $CF_4$ gas flow to the He gas flow is between about 2.2 and about 3 can be used in the first portion (i.e. ME) of the first RIE. For further reduce the impact of the $CF_4$ plasma to the underlayer 306 during the second portion (i.e. OE) of the first RIE, it is desired to reduce the ratio of the $CF_4$ to He, a suitable such ratio is between about 1.2 and about 1.8. It must be careful while introducing He gas into the plasma, too much helium gas may make it difficult to strike and maintain a stable plasma due to the very low ionization ability of helium atoms, and too less helium gas may not have sufficient effect to reduce the plasma damage to the underlayer.

An ideal underlayer mask formed after the second RIE process should have such features that the cross section of the mask around the ABS is a slightly tapered trapezoid with a smaller bottom critical dimension (CD) than the top CD and the edge profile is straight and smooth. Additionally, there should be no top undercut at the interface between the dielectric hard mask layer 308 and the polymeric underlayer 306 and no footing at the bottom of the polymeric underlayer mask 306.

Figure 5:
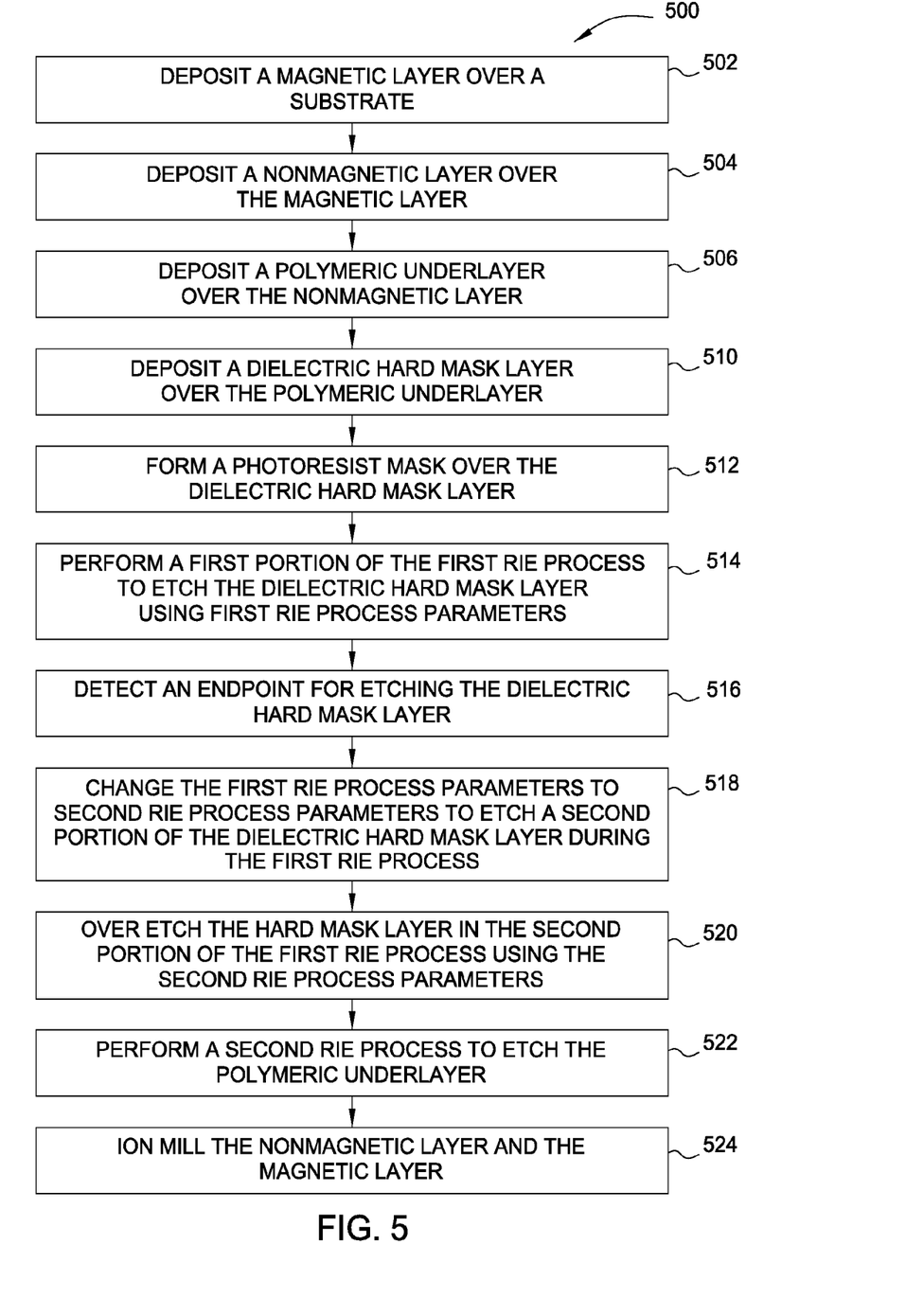
FIG. 5 is a flowchart showing the process of fabricating the write pole.

FIG. 5 is a flowchart 500 showing the process of fabricating the write pole. In the step 502, a magnetic layer 304 is deposited over a substrate 302. In step 504, a nonmagnetic layer 305 is deposited over the magnetic layer 304. Thereafter, in step 506, a polymeric underlayer 306 is deposited over the nonmagnetic layer 304. Then, in step 510, a dielectric hard mask layer 308 is deposited over the polymeric underlayer 306. A photoresist mask is then formed over the dielectric hard mask layer 308 in step 512.

After forming the photoresist mask, a first portion of a first RIE process is performed in step 514 to etch the dielectric hard mask layer 308 and expose the polymeric underlayer 306. During the first portion of the first RIE process, $CF_4$, helium and $CHF_3$ gas are introduced to the chamber while both the source power and bias power are applied to the RIE chamber. The ratio of $CF_4$ to $CHF_3$ is between about 1.3 and about 2, and another gas ratio of $CF_4$ to He is between about 2.2 and about 3 and the power ratio of the source power to the bias power may be between about 10 and about 16.

At step 516, the endpoint of the dielectric hard mask layer etching is detected, and the first RIE process parameters change in step 518. Thereafter, an over etching, referred to as a second portion of the first RIE process proceeds in step 520. The ratio of $CF_4$ to $CHF_3$ is lowered to between about 0.3 and about 0.8, and another gas ratio of $CF_4$ to He is also decreased to between about 1.2 and about 1.8 (as compared to the first portion of the first RIE process) and the power ratio of the source power to the bias power is increased to between about 22 and about 28.

Once the second portion of the first RIE process is completed, a second, oxygen-based chemistry RIE process occurs to etch the polymeric underlayer in step 522. Finally, following the second RIE process, an ion milling process occurs to mill the non magnetic layer and the magnetic layer in step 524. The ion milling occurs with argon gas.

The application of the new RIE over etch process in the first RIE process greatly reduces the possibility of top-defects formed in the second RIE process, thus making the underlayer more suitable for the subsequent ion mill process.

While the foregoing is directed to embodiments of the present invention, other and further embodiments of the invention may be devised without departing from the basic scope thereof, and the scope thereof is determined by the claims that follow.

What is claimed is:

1. A method of making a write pole for a perpendicular magnetic recording write head, comprising:
   forming a photoresist mask over a dielectric hard mask layer of a stack such that the photoresist mask covers a first portion of the dielectric hard mask layer and leaves a second portion exposed, wherein the stack comprises:
      a layer of magnetic material formed over a substrate;
      a layer of non-magnetic material formed over the layer of magnetic material;
      a polymeric underlayer formed over the layer of non-magnetic material; and
      the dielectric hard mask layer formed over the polymeric underlayer;
   performing a first reactive ion etch process to remove the exposed second portion of the dielectric hard mask layer such that a portion of the polymeric underlayer is exposed and a dielectric hard mask is formed, wherein a first portion of the first reactive ion etch process comprises exposing the second portion of the dielectric hard mask layer to an etching gas comprising $CF_4$ and $CHF_3$, wherein a ratio of $CF_4$ to $CHF_3$ in the first portion is between about 1.3 and about 2, wherein a second portion of the first reactive ion etch process uses an etching gas comprising $CF_4$, and $CHF_3$, and wherein a gas flow ratio of $CF_4$ to $CHF_3$ in the second portion is between about 0.3 to 0.8; and
   performing a second reactive ion etch process to remove the exposed polymeric underlayer to expose the layer of non-magnetic material.

2. The method of claim 1, wherein the etching gas used in the first portion of the first reactive ion etch process additionally comprises helium, and a ratio of $CF_4$ to He is between about 2.2 and about 3.

3. The method of claim 1, wherein the first portion of the first reactive ion etch process further comprises applying a source power to the RIE chamber and a RF bias to an electrode wherein the ratio of the source power to the bias power is between about 10 and about 16.

4. The method of claim 1, wherein the second reactive ion etch process forms a polymeric underlayer mask that is tapered from the dielectric hard mask to the layer of non-magnetic material.

5. The method of claim 4, further comprising:
removing the exposed portions of the layer of non-magnetic material to expose the layer of magnetic material; and
removing exposed portions of the layer of magnetic material to form a write pole that is tapered from the polymeric underlayer mask to the substrate.

6. The method of claim 5, wherein the second reactive ion etch process is performed utilizing an oxygen based chemistry.

7. The method of claim 6, wherein the oxygen based chemistry utilizes $CO_2$ and $N_2$ gases.

8. The method of claim 7, wherein removing exposed portions of the layer of non-magnetic material and removing the exposed portions of the layer of magnetic material comprises ion milling.

9. The method of claim 8, wherein the ion milling is performed with argon ions.

10. The method of claim 9, wherein the polymeric underlayer mask that is tapered from the dielectric hard mask to the layer of non-magnetic material at an angle of between about 0.5 degrees to about 1.0 degrees.

11. A method of making a write pole for a perpendicular magnetic recording write head, comprising:
forming a photoresist mask over a dielectric hard mask layer of a stack such that the photoresist mask covers a first portion of the dielectric hard mask layer and leaves a second portion exposed, wherein the stack comprises:
a layer of magnetic material formed over a substrate;
a layer of non-magnetic material formed over the layer of magnetic material;
a polymeric underlayer formed over the layer of non-magnetic material; and
the dielectric hard mask layer formed over the polymeric underlayer;
performing a first reactive ion etch process to remove the exposed second portion of the dielectric hard mask layer such that a portion of the polymeric underlayer is exposed and a dielectric hard mask is formed, wherein a first portion the first reactive ion etch process further comprises applying a source power to the RIE chamber and a RF bias to an electrode wherein the ratio of the source power to the bias power in the first portion is greater than 10 and up to about 16, and wherein a second portion of the first reactive ion etch process also applies a source power to the RIE chamber and a RF bias to an electrode wherein the ratio of the source power to the bias power in the second portion is between about 22 and about 28; and
performing a second reactive ion etch process to remove the exposed polymeric underlayer to expose the layer of non-magnetic material.

12. The method of claim 11, wherein the etching gas used in the first portion of the first reactive ion etch process additionally comprises helium, and a ratio of $CF_4$ to He is between about 2.2 and about 3.

13. The method of claim 12, wherein the first portion of the first reactive ion etch process comprises exposing the second portion of the dielectric hard mask layer to an etching gas comprising $CF_4$ and $CHF_3$, wherein a ratio of $CF_4$ to $CHF_3$ is between about 1.3 to about 2.

14. The method of claim 13, wherein the second reactive ion etch process is performed utilizing an oxygen based chemistry.

15. The method of claim 14, wherein the oxygen based chemistry utilizes $CO_2$ and $N_2$ gases.

16. The method of claim 15, further comprising:
removing the exposed portions of the layer of non-magnetic material to expose the layer of magnetic material; and
removing exposed portions of the layer of magnetic material to form a write pole that is tapered from the polymeric underlayer mask to the substrate.

17. The method of claim 16, wherein removing exposed portions of the layer of non-magnetic material and removing the exposed portions of the layer of magnetic material comprises ion milling.

18. The method of claim 17, wherein the ion milling is performed with argon ions.

19. The method of claim 18, wherein the polymeric underlayer mask that is tapered from the dielectric hard mask to the layer of non-magnetic material at an angle of between about 0.5 degrees to about 1.0 degrees.

20. A method of making a write pole for a perpendicular magnetic recording write head, comprising:
forming a photoresist mask over a dielectric hard mask layer of a stack such that the photoresist mask covers a first portion of the dielectric hard mask layer and leaves a second portion exposed, wherein the stack comprises:
a layer of magnetic material formed over a substrate;
a layer of non-magnetic material formed over the layer of magnetic material;
a polymeric underlayer formed over the layer of non-magnetic material; and
the dielectric hard mask layer formed over the polymeric underlayer;
performing a first reactive ion etch process to remove the exposed second portion of the dielectric hard mask layer such that a portion of the polymeric underlayer is exposed and a dielectric hard mask is formed, wherein the first reactive ion etch process further comprises a first portion of the first reactive ion etch process and a second portion of the first reactive ion etch process to remove the exposed second portion of the dielectric hard mask layer such that a portion of the polymeric underlayer is exposed and a dielectric hard mask is formed, wherein the first portion of the first reactive ion etch process further comprises introducing an etching gas comprising $CF_4$ and $CHF_3$ and He, wherein a gas flow ratio of $CF_4$ to $CHF_3$ is between about 1.3 to 2, a gas flow ratio of $CF_4$ to He is between 2.2 and about 3, and a ratio of RF source power to RF bias power is between about 10 and about 16, wherein the second portion of the first reactive ion etch process also uses gas comprising of $CF_4$, $CHF_3$ and He, wherein a gas flow ratio of $CF_4$ to $CHF_3$ is between about 0.3 to 0.8, a gas flow ratio of $CF_4$ to He is between about 1.2 and about 1.8, and a power ratio of the RF source power to RF bias is between about 22 to 28;

performing a second reactive ion etch process to remove the exposed polymeric underlayer to expose the layer of non-magnetic material using oxygen based chemistry comprising of $CO_2$ and $N_2$ gases;

ion milling the exposed portions of the layer of non-magnetic material to expose the layer of magnetic material using an Ar ion beam; and ion milling exposed portions of the layer of magnetic material to form a write pole that is tapered from the polymeric underlayer mask to the substrate using an Ar ion beam.

* * * * *